United States Patent
Monzani et al.

(10) Patent No.: US 11,427,680 B2
(45) Date of Patent: Aug. 30, 2022

(54) (PER)FLUOROPOLYETHER POLYMERS

(71) Applicant: SOLVAY SPECIALTY POLYMERS ITALY S.P.A., Bollate (IT)

(72) Inventors: Cristiano Monzani, Trezzo sull'Adda (IT); Vito Tortelli, Milan (IT); Marco Galimberti, Bollate (IT); Roberto Valsecchi, Verdellino (IT); Patrizia Maccone, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 700 days.

(21) Appl. No.: 16/469,636

(22) PCT Filed: Dec. 12, 2017

(86) PCT No.: PCT/EP2017/082331
§ 371 (c)(1),
(2) Date: Jun. 13, 2019

(87) PCT Pub. No.: WO2018/108866
PCT Pub. Date: Jun. 21, 2018

(65) Prior Publication Data
US 2020/0079902 A1 Mar. 12, 2020

(30) Foreign Application Priority Data

Dec. 14, 2016 (EP) .................... 16204181

(51) Int. Cl.
*C08G 65/00* (2006.01)
*C08G 65/323* (2006.01)
*C08G 65/331* (2006.01)
*G11B 5/71* (2006.01)
*C10M 107/38* (2006.01)

(52) U.S. Cl.
CPC ....... *C08G 65/007* (2013.01); *C08G 65/3236* (2013.01); *C08G 65/3312* (2013.01); *C10M 107/38* (2013.01); *G11B 5/71* (2013.01)

(58) Field of Classification Search
CPC .................................................. C08G 65/3236
See application file for complete search history.

(56) References Cited

U.S. PATENT DOCUMENTS

| | | | | |
|---|---|---|---|---|
| 3,985,810 | A | * 10/1976 | von Halasz | C08G 65/3236 568/677 |
| 5,185,421 | A | 2/1993 | Cohen | |
| 5,300,683 | A | * 4/1994 | Bierschenk | C08G 65/007 568/604 |
| 8,513,471 | B2 | 8/2013 | Tonelli et al. | |
| 8,742,142 | B2 | 6/2014 | Tortelli et al. | |
| 2016/0137947 | A1 | * 5/2016 | Isobe | C10M 107/38 564/13 |

FOREIGN PATENT DOCUMENTS

WO 2014195299 A1 12/2014

OTHER PUBLICATIONS

Marchionni G. et al., "Structure-Property Relationships in Perfluoropolyethers: A Family of Polymeric Oils", Comprehensive Polymer Science and Supplements, 1996, p. 347-388, ed. by Allen G. et al., Elsevier Ltd.
Feiring A. E., "Synthesis of New Fluoropolymers: Tailoring Macromolecular Properties with FLuorinated Substituents", Journal of Macromolecular Science, 1994, vol. A31 n°11, p. 1657-1673, Marcel Dekker Inc.
Yang S. et al., "Novel fluorine-containing anionic aqueous polyurethane", Journal of Macromolecular Science, 1993, vol. 30 no°2-3, p. 241-252, Marcel Dekker Inc.

* cited by examiner

*Primary Examiner* — Christopher M Rodd
(74) *Attorney, Agent, or Firm* — Osha Bergman Watanabe & Burton LLP

(57) ABSTRACT

The present invention relates to a novel process for the synthesis of (per)fluoropolyether polymers, to certain novel (per)fluoropolyether polymers. The present invention also relates to the use of the (per)fluoropolyether polymers thus obtained as intermediate compounds for the manufacture of further polymers suitable for use as lubricants, notably for magnetic recording media (MRM).

17 Claims, No Drawings

(PER)FLUOROPOLYETHER POLYMERS

CROSS-REFERENCE TO RELATED PATENT APPLICATIONS

This application is a U.S. national stage entry under 35 U.S.C. § 371 of International Application No. PCT/EP2017/082331 filed Dec. 12, 2017, which claims priority to European patent application No. EP 16204181.8, filed on Dec. 14, 2016. The entire contents of these applications are explicitly incorporated herein by this reference.

TECHNICAL FIELD

The present invention relates to a novel process for the synthesis of (per)fluoropolyether polymers, to certain novel (per)fluoropolyether polymers. The present invention also relates to the use of the (per)fluoropolyether polymers thus obtained as intermediate compounds for the manufacture of further polymers suitable for use as lubricants, notably for magnetic recording media (MRM).

BACKGROUND ART

Among fluorinated polymers, (per)fluoropolyether polymers (PFPEs) are well-known and of great interest for their chemical and physical properties, which make them particularly interesting as lubricants.

Several synthesis of PFPEs polymers have been disclosed in the art. The first synthesis of unspecified perfluorinated polyether mixtures was reported in 1953, when an oily product was obtained in the course of photoligomerization of hexafluoropropene. Since then, a number of different perfluorinated polyethers have been synthesized and described in literature. (ALLEN, Geoffrey, et al. COMPREHENSIVE POLYMER SCIENCE—Second supplement. Edited by SIR ALLEN, Geoffrey, et al. Elsevier Science & Technology Books, 1996. ISBN 0080427081. p. 347-388.).

For example, the catalytic polymerization of perfluoroepoxides, such as notably hexafluoropropylene oxide (HFPO), firstly disclosed by Du Pont researchers, led to a product commercially available under the trade name Krytox®, which has a backbone comprising recurring units of formula $-[CF(CF_3)CF_2O]_y-$. Then, Montedison researchers disclosed the photochemical oxidation of perfluoroolefins, such as tetrafluoroethylene and hexafluoropropene, which led to a product commercially available under the trade name Fomblin®, which has a backbone comprising randomly distributed recurring units of formula $-[(CF_2O)_m(CF_2CF(R)O)_n]-$ wherein R if $-F$ or $-CF_3$. Another synthesis, which involved the ring opening polymerisation of partially fluorinated oxetanes followed by fluorination, was disclosed by Daikin Company and led to a product commercially available under the trade name Demnum®, which has a backbone comprising recurring units of formula $-(CF_2CF_2CF_2O)_p-$.

The main difference between the (per)fluoropolyether polymers known in the art resides in the fact that Krytox® polymers and Demnum® polymers are homopolymers characterized by an ordered structure, which comprises only one type of recurring unit, i.e. $-[CF(CF_3)CF_2O]_y-$ and $-(CF_2CF_2CF_2O)_p-$, respectively. Differently, Fomblin® polymers are copolymers characterized by the presence of two or more recurring units having a different formula and being randomly (or statistically) distributed along the backbone chain. This random (or statistical) distribution of the recurring units is due to the manufacturing process, that is based on photochemical oxidation. However, the random distribution of the recurring units could led to a backbone chain comprising multiple consecutive recurring units having one carbon atoms (i.e., of formula $-CF_2O-$), which on the one hand increase the flexibility of the polymer backbone but on the other hand constitute a weak point in the polymer backbone, as they are more easily attacked by metals and/or Lewis acids.

The polymerization of fluorinated vinyl ether alcohols, followed by fluorination of the intermediate partially-fluorinated structure, was disclosed by FEIRING, Andrew E. Synthesis of New Fluoropolymers: Tailoring Macromolecular Properties with FLuorinated Substituents. *Journal of Macromolecular Science.* 1994, vol. A31, no. 11, p. 1657-1673. However, the first approach described in this article starts from a partially fluorinated compound bearing within the same molecule both the hydroxy group and vinyl ether group (i.e., $CF_2=CFOCF_2CF(CF_3)OCF_2CF_2CH_2OH$), such that final polymer has a backbone comprising only one recurring unit of formula $-(CF_2CF_2OCF_2CF(CF_3)OCF_2CF_2CF_2O)_n-$. Another approach described in this article comprises the reaction between the compound mentioned above of formula $CF_2=CFOCF_2CF(CF_3)OCF_2CF_2CH_2OH$ and a partially fluorinated diol (for example of formula $HOCH_2(CF_2)_3CH_2OH$) to provide telechelic macrodiols to be used for the production of further copolymers, such as for example those described in U.S. Pat. No. 5,185,421 (E.I. DU PONT DE NEMOURS AND COMPANY) and by YANG, S., et al. Novel fluorine-containing anionic aqueous polyurethane. *Journal of Macromolecular Science.* 1993, vol. 30, p. 241-252.

Fluorinated polyether compounds have been also disclosed in US 2016/0137947 (ASAHI GLASS COMPANY, LIMITED). This patent application in particular discloses fluorinated polyether compounds represented by the following formula:

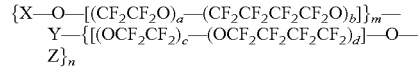

wherein
m is from 1 to 10;
n is from 0 to 10;
X is a group having a hydroxy group, a carboxy group, an ester group or an aryl group;
Y is an (m+n) valent alkane group, an (m+n) valent alkane group having an etheric oxygen atom inserted between carbon-carbon atoms, an (m+n) valent fluoroalkane group, an (m+n) valent fluoroalkane group having an etheric oxygen atom inserted between carbon-carbon atoms, or a cyclotriphosphazene structure ($P_3N_3$); and
Z is a group not having a hydroxy group, a carboxy group, an ester group or an aryl group, and having a haloalkyl group (provided that the halogen atom is a fluorine atom or a chlorine atom) or a haloalkyl group (provided that the halogen atom is a fluorine atom or a chlorine atom) having an etheric oxygen inserted between carbon-carbon atoms. In the moiety $-[(CF_2CF_2O)_a-(CF_2CF_2CF_2CF_2O)_b]-$ the linking order of "a" number of units ($CF_2CF_2O$) and "b" number of units ($CF_2CF_2CF_2CF_2O$) is not limited, i.e. units ($CF_2CF_2O$) and ($CF_2CF_2CF_2CF_2O$) may be randomly located, alternately arranged or at least one block consisting of a plurality of units ($CF_2CF_2O$) and units ($CF_2CF_2CF_2CF_2O$) may be linked. Structures having the following formula are preferred:

wherein e is from 1 to 99.

SUMMARY OF INVENTION

The Applicant faced the problem of preparing (per)fluoropolyether polymers having a pre-defined chemical structure, i.e. (per)fluoropolyether polymers characterized by recurring units which distribution in the polymer backbone is non-random but defined a priori.

Surprisingly, the Applicant found a process, which can be conveniently applied on industrial scale, for the synthesis of perfluoro-polyether polymers wherein the recurring units are not randomly distributed in the backbone chain.

In a first aspect, the present invention relates to a process [process ($P_{FH}$)] for the synthesis of at least one polymer [polymer (FH)] comprising a partially fluorinated polyether backbone having two chain ends, wherein said chain ends comprise at least one group selected from hydroxy group, allyl group and vinyl group, said process comprising the step of:

(I) contacting at least one perfluoro compound [compound (F)] comprising at least two unsaturated groups selected from vinyl groups and allyl groups, with at least one fully or partially hydrogenated compound [compound (H)] comprising at least two hydroxy groups,
to provide a polymer (FH),
said polymer (FH) being characterized in that its backbone comprises recurring unit(s) derived from said at least one compound (F) alternately arranged with recurring unit(s) derived from said at least one compound (H).

Advantageously, the process according to the present invention allows to prepare polymers comprising a (per)fluoropolyether backbone comprising recurring units which are distributed within the backbone in a pre-determined and well defined way.

The Applicant noted that polymer (FH) as obtained after step (I) of process ($P_{FH}$) according to the present invention is novel.

Thus, in a second aspect, the present invention relates to a polymer [polymer (FH*)] comprising a partially fluorinated polyether backbone having two chain ends, wherein each of said chain ends comprises a group selected from hydroxy group, allyl group or vinyl group; and said backbone complies with the following structure ($R_{FH}$-I):

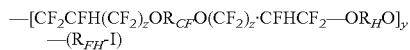
—($R_{FH}$-I)

wherein
each of z and z* is independently 0 or 1;
$R_{CF}$ is a perfluoro alkylene chain comprising from 1 to 20, preferably from 2 to 10, carbon atoms and optionally interrupted by one or more oxygen atoms;
$R_H$ is a linear or branched alkylene chain comprising from 2 to 12, preferably from 2 to 6, carbon atoms, said alkyl chain optionally comprising one or more fluorine atoms and optionally being interrupted by one or more oxygen atoms; and
y is an integer, such that the average number molecular weight of the backbone of said polymer (FH) is from 306 to 50 000, preferably from 400 to 10 000, more preferably from 500 to 5 000, and even more preferably from 600 to 3 000.

Advantageously, said at least one polymer (FH) can be further reacted in order to provide a polymer comprising a fully fluorinated polyether backbone.

Thus, in a third aspect, the present invention relates to a process [process ($P_{PFPE}$)] for the synthesis of a polymer [polymer (PFPE)] comprising a perfluorinated polyether backbone having two chain ends, wherein each chain end comprises at least one group selected from —OC(═O)F and perfluorinated alkyl chain comprising from 2 to 3 carbon atoms, said process comprising the step of:

(III) contacting at least one polymer (FH) obtained in step (I) of process ($P_{FH}$) as defined above with a source of fluorine, to provide polymer (PFPE).

In a fourth aspect, the present invention relates to a perfluoro-polyether polymer [polymer (PFPE)], said polymer (PFPE) comprising a perfluoropolyether backbone having two chain ends, wherein: each chain end comprises at least one group selected from —OC(═O)F and perfluorinated alkyl chain comprising from 2 to 3 carbon atoms and said backbone complies with the following structure ($R_{pf}$-I):

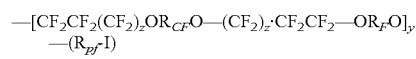

wherein
$R_{CF}$ is a perfluoro alkyl chain comprising from 1 to 20, preferably from 2 to 10 carbon atoms, optionally interrupted by one or more oxygen atoms;
$R_F$ is a perfluoro alkyl chain comprising from 2 to 12, preferably from 2 to 6, carbon atoms, optionally interrupted by one or more oxygen atoms;
each of z and z* is independently 0 or 1; and
y is an integer, such that the average number molecular weight of the backbone of said polymer (PFPE) is from 414 to 70 000, preferably from 600 to 50 000, more preferably from 700 to 10 000, and even more preferably from 800 to 5 000;
with the proviso that:
when both z and z* are 0, at least one of said moiety $R_{CF}$ and said moiety $R_F$ is different from —$CF_2CF_2$— and —$CF_2CF_2CF_2CF_2$—;
when both z and z* are 1, at least one of moiety $R_{CF}$ and moiety $R_F$ is different from —$CF_2CF_2CF_2$—.

The Applicant surprisingly found that the process according to the present invention allows to modulate the structure of the perfluoro-polyether polymers, and hence the physical and chemical properties thereof, and notably the stiffness (or the mobility) of the polymeric backbone.

In still a further aspect, the present invention relates to the use of at least one polymer (FH) as defined above, as an intermediate compound in the synthesis of at least one polymer (PFPE) as defined above.

DESCRIPTION OF EMBODIMENTS

For the purpose of the present description and of the following claims:
the use of parentheses around symbols or numbers identifying the formulae, for example in expressions like "polymer ($PFPE_{FOR}$)", etc., has the mere purpose of better distinguishing the symbol or number from the rest of the text and, hence, said parenthesis can also be omitted;
the term "(per)fluoropolyether" is intended to indicate polyether polymer(s) comprising a fully fluorinated or partially fluorinated backbone;
the term "perfluoropolyether" is intended to indicate polyether polymer(s) comprising a fully fluorinated backbone;
the expression "neutral group" is intended to indicate fluorine atom or a linear or branched perfluoroalkyl chain having from 1 to 10 carbon atoms, such as for example, —$CF_3$, —$C_2F_5$, —$C_3F_7$;
the expression "functional group" is intended to indicate a group different from said neutral group. suitable examples of said functional group are: —OH, —C(O) OR wherein R is hydrogen atom or a linear or branched alkyl group having from 1 to 6 carbon atoms; linear or branched alkyl chain having from 1 to 12 carbon atoms wherein the alkyl chain is optionally interrupted by at least one oxygen atom and/or optionally substituted with at least one —OH group; amino, amide, triazine, phosphazene, siloxane.

Preferably, said compound (F) complies with the following formula:

$$CF_2=CF(CF_2)_zOR_{CF}O(CF_2)_{z*}CF=CF_2$$

wherein
each of z and z* is independently 0 or 1; and
$R_{CF}$ has the same meanings defined above for polymer PFPE.

Preferred compounds (F) are those complying with the following formulae (F-I) to (F-VIII):

$$CF_2=CFO(CF_2)_2OCF=CF_2 \quad (F\text{-}I)$$

$$CF_2=CFO(CF_2)_3OCF=CF_2 \quad (F\text{-}II)$$

$$CF_2=CFO(CF_2)_4OCF=CF_2 \quad (F\text{-}III)$$

$$CF_2=CFCF_2O(CF_2)_4OCF_2CF=CF_2 \quad (F\text{-}IV)$$

$$CF_2=CFO-CF_2O-(CF_2)_2O(CF_2)_2O-CF_2O-CF=CF_2 \quad (F\text{-}V)$$

$$CF_2=CFO-CF_2O-(CF_2)_2O-CF_2O-CF=CF_2 \quad (F\text{-}VI)$$

$$CF_2=CFO-CF_2O-(CF_2)_3O-CF_2O-CF=CF_2 \quad (F\text{-}VII)$$

$$CF_2=CFO-CF_2O-(CF_2)_4O-CF_2O-CF=CF_2 \quad (F\text{-}VIII)$$

Among compounds (F) above, those complying with formulae (F-V) to (F-VII) above are deemed to be novel.

Accordingly, in a further aspect, the present invention relates to a compound complying with one of formulae (F-V) to (F-VII) as represented above and to the use of each of said compound as intermediate compound in the synthesis of polymer (FH) or of polymer (PFPE) as defined above.

Preferably, compound (H) complies with the following formula:

$$HO-(R_H)-OH$$

wherein
$R_H$ is a linear or branched alkylene chain comprising from 2 to 12, preferably from 2 to 6, carbon atoms, said alkyl chain optionally comprising one or more fluorine atoms(s) and optionally being interrupted by one or more oxygen atoms.

More preferably, said alkylene chain is linear.

Preferred compounds (H) are those complying with formulae (H-I) to (H-V):

$$HOCH_2(CH_2)_3CH_2OH \quad (H\text{-}I)$$

$$HO(CH_2)_2OH \quad (H\text{-}II)$$

$$HO(CH_2)_3OH \quad (H\text{-}III)$$

$$HO(CH_2)_4OH \quad (H\text{-}IV)$$

$$OHCH_2CH_2OCH_2CH_2OH \quad (H\text{-}V)$$

Preferably, the molar ratio between said compound (H) and said compound (F) is from 0.1 to 25, more preferably from 0.5 to 22 and even more preferably from 1 to 20.

According to one embodiment, said step (I) optionally comprises adding, to said compound (F) and to said compound (H), one or more compound [compound (F-mono)] comprising one unsaturated group selected from vinyl group and allyl group, and/or one compound [compound (H-mono)] comprising one hydroxy group.

Said compound (F-mono) is preferably selected from those of formula:

$$CF_3OCF=CF_2, C_2F_5OCF=CF_2, C_3F_7OCF=CF_2,$$
$$CF_3OCF_2OCF=CF_2, CF_3CF=CF_2, CF_2=CF_2$$
$$(TFE).$$

Said compound (H-mono) is preferably selected from those of formula:

$$CH_3OH, C_2H_5OH, C_3H_7OH, CF_3CH_2OH, (CF_3)_2CHOH \text{ and } (CH_3)_2CHOH$$

Preferably, step (I) is performed under heating, such as for example at a temperature of from 30° C. to 80° C., preferably from 35° C. to 75° C.

Preferably, step (I) is performed in the presence of a base. Suitable bases are selected in the group comprising NaOH, KOH, NH$_4$OH, NaH, trialkylamines, guanidines such as notably tetramethyl guanidine, and 1,4-diazabicyclo[2.2.2]octane ("DABCO").

Optionally, step (I) is performed in the presence of a solvent, said solvent being preferably selected in the group comprising, more preferably consisting of, at least one polar aprotic solvent or at least one hydrofluoroether (HFE).

Preferably, said polar aprotic solvent is selected in the group comprising, more preferably consisting of, compounds bearing two hydroxy groups, dimethoxyethane (glyme), bis(2-methoxyethyl) ether (di-glyme), triethylene glycol dimethyl ether (tri-glyme), tetraethylene glycol dimethyl ether (tetraglyme), tetrahydrofuran, acetonitrile, dimethyl sulfoxide, dimethylformamide, ethylene polyoxides dimethylethers. Acetonitrile being particularly preferred.

Step (I) is preferably performed by adding said compound (F) to said compound (H). Alternatively, said compound (H) can be added to said compound (F) or said compound (F) and said compound (H) are added at the same time to the reaction environment.

Preferably, ($R_{CF}$) is a linear or branched perfluoro alkyl chain comprising from 2 to 10, more preferably from 2 to 6, carbon atoms, and optionally interrupted by one or more oxygen atoms.

Suitable examples of said moiety ($R_{CF}$) are the following divalent chains:

$$-CF_2-; -C_2F_4-; -C_3F_6-; -C_4F_8-;$$
$$-C_xF_{2x}-;$$

$$CF_2O-CF_2CF_2O-CF_2CF_2O-CF_2-;$$

$$-CF_2O-(CF_2)_2OCF_2-;$$

$$-CF_2O-(CF_2)_3OCF_2-;$$

$$CF_2O-(CF_2)_4OCF_2-;$$

wherein x is an integer from 5 to 12, more preferably from 5 to 8.

According to a preferred embodiment, ($R_{CF}$) does not comprises two consecutive recurring units of formula $-(CF_2O)_a-$.

Depending on the molar ratio of compound (F) and of compound (H) used in step (I), polymer(s) (FH) is(are) obtained comprising at their chain ends two allyl or vinyl groups, two hydroxy groups or one hydroxy and one allyl or vinyl group.

More in particular, when the molar ratio between compound (F) and compound (H) is higher than 1, i.e. when compound (F) is used in molar excess compared to compound (H), polymer (FH) comprising at its chain end two allyl or vinyl groups is preferably obtained.

According to this first variant, polymer (FH) having the following general formula $(FH_{b1})$ is obtained:

$$CF_2=CF(CF_2)_zOR_{CF}O(CF_2)_{z*}CFHCF_2-OR_HO-$$
$$[CF_2CFH(CF_2)_zOR_{CF}O(CF_2)_{z*}CFHCF_2-$$
$$OR_HO]_y-CF_2CFH(CF_2)_zOR_{CF}O(CF_2)_{z*}$$
$$CF=CF_2 \quad (FH_{b1})$$

wherein $R_{CF}$, $R_H$, z, z* and y are as defined above.

It will be apparent to those skilled in the art that the very same polymer having general formula $(FH_{b1})$ can also be written using a different general formula while, however, the very same polymer is intended. One alternative is for example the following:

$$CF_2=CF(CF_2)_zO[R_{CF}O(CF_2)_{z*}CFHCF_2-OR_HO-$$
$$CF_2CFH(CF_2)_zO]_yR_{CF}O(CF_2)_{z*}CF=CF_2 \quad (FH_{b1*})$$

wherein $R_{CF}$, $R_H$, z, z* and y are as defined above.

Preferably, when the molar ratio between compound (F) and compound (H) is lower than 1, i.e. when compound (H) is used in molar excess compared to compound (F), polymer (FH) comprising at its chain end two hydroxy groups is preferably obtained.

According to this second variant, polymer (FH) having the following general formula $(FH_{b2})$ is obtained:

$$HO-R_H-O[CF_2CFH(CF_2)_zOR_{CF}O(CF_2)_{z*}$$
$$CFHCF_2-OR_HO]_y-H \quad (FH_{b2})$$

wherein $R_{CF}$, $R_H$, z, z* and y are as defined above.

Also, when the molar ratio between compound (F) and compound (H) is about 1, i.e. when a stoichiometric amount of compound (F) and of compound (H) are used, polymer (FH) comprising at one chain end a hydroxy group and at the other chain end an allyl or vinyl group is preferably obtained.

According to this third variant, polymer (FH) having the following general formula $(FH_{b3})$ is obtained:

$$CF_2=CF(CF_2)_zOR_{CF}O(CF_2)_{z*}CFHCF_2-OR_HO-$$
$$[CF_2CFH(CF_2)_zOR_{CF}O(CF_2)_{z*}CFHCF_2-$$
$$OR_HO]_y-H \quad (FH_{b3})$$

wherein $R_{CF}$, $R_H$, z, z* and y are as defined above.

It will be clear to those skilled in the art, that while the reaction conditions of step (I) are controlled, a mixture of polymer $(FH_{b1})$, polymer $(FH_{b2})$ and polymer $(FH_{b3})$ as defined above can be obtained and is encompassed within the present invention. As a consequence, after step (III), mixtures of polymers (PFPE) will be obtained as will be described in great detail later.

At least one polymer (FH) complying with any one of formulae $(FH_{b1})$ to $(FH_{b3})$ as defined above is advantageously reacted under step (III) of process $(P_{PFPE})$.

Advantageously, said step (III) is performed in the presence of a source of fluorine.

Preferably, said source of fluorine is a gas containing fluorine atoms. More preferably, said source of fluorine is fluorine gas $(F_2)$.

Advantageously, the source of fluorine in step (III) is used in admixture with a diluting gas, preferably selected from inert gas, such as helium and nitrogen.

Advantageously, a halogenated olefin can be added in order to generate fluorine radicals to help the fluorination step. Said halogenated olefin can be selected for example from tetrafluoroethylene (TFE), hexafluoropropylene (HFP), octafluorobutene, perfluoropentene, perfluorohexene, perfluoroheptene, perfluorooctene, perfluorocyclobutene, perfluorocyclopentene, perfluorocyclohexene, chlorotrifluoroethylene (CTFE), dichlorodifluoroethylene, chloropentafluoropropene, perfluorobuta-diene, perfluoro-methylvinylether, perfluoro-ethylvinylether, perfluoro-propylvinylether; $CF_3OCIC=CCIF$, trichloroethylene, tetrachloroethylene, dichloroethylene isomers; and fluorodioxoles.

According to a first variant of process $(P_{PFPE})$, polymer (FH) complying with formula $(FH_{b1})$ as defined above is reacted under step (III) of process $(P_{PFPE})$, to provide a polymer [polymer $(PFPE_{b1})$] comprising a perfluoropolyether backbone as defined above for polymer (PFPE) and having two chain ends, wherein both chain ends comprise a perfluorinated alkyl chain comprising 2 or 3 carbon atoms.

According to a second variant of process $(P_{PFPE})$, when at least one polymer (FH) complying with formula $(FH_{b2})$ and/or with formula $(FH_{b3})$ as defined above is reacted under step (III) process $(P_{PFPE})$, step (II) and step (IV) are advantageously performed before and after step (III), respectively.

Preferably, step (II) is performed by contacting said at least one polymer (FH) complying with formula $(FH_{b2})$ and/or with formula $(FH_{b3})$ as defined above, with at least one compound capable of forming a fluoroformate group.

More preferably, step (II) is performed by contacting said polymer (FH) with $F_2C(=O)$, $ClFC(=O)$, $BrFC(=O)$.

After step (II), the following polymers are obtained:

$$F(O=)C-O-R_H-O[CF_2CFH(CF_2)_zOR_{CF}O$$
$$(CF_2)_{z*} CFHCF_2-OR_HO]_y-C(=O)F \quad (FH_{b3\text{-}COF})$$

$$CF_2=CF(CF_2)_zOR_{CF}O(CF_2)_{z*}CFHCF_2-OR_HO-$$
$$[CF_2CFH(CF_2)_zOR_{CF}O(CF_2)_{z*}CFHCF_2-$$
$$OR_HO]_y-C(=O)F \quad (FH_{b3\text{-}COF})$$

wherein $R_H$, $R_{CF}$, z, z* and y are as defined above.

Said polymer $(FH_{b2\text{-}COF})$ and/or said polymer $(FH_{b3\text{-}COF})$ are then reacted under step (III) of the process according to the present invention.

Preferably, step (III) is performed under the same conditions and using the same reactants defined above.

After step (III), the following polymers comprising a perfluorinated backbone are obtained:

$$F(O=)C-O-R_F-O[CF_2CF_2(CF_2)_zOR_{CF}$$
$$O(CF_2)_{z*}CF_2CF_2-OR_FO]_y-C(=O)F \quad (PFPE_{b2\text{-}COF})$$

$$CF_3CF_2(CF_2)_zOR_{CF}O(CF_2)_{z*}CF_2CF_2-OR_FO-$$
$$[CF_2CF_2(CF_2)_zOR_{CF}O(CF_2)_{z*}CF_2CF_2-OR_F$$
$$O]_y-C(=O)F \quad (PFPE_{b3\text{-}COF})$$

wherein $R_F$, $R_{CF}$, z, z* and y are as defined above.

Said polymer $(PFPE_{b2\text{-}COF})$ and/or said polymer $(PFPE_{b3\text{-}COF})$ are then reacted under step (IV) of the process according to the present invention.

Said step (IV) comprises reacting each fluoroformate group to provide a polymer [polymer $(PFPE_{EST})$] comprising perfluoropolyether backbone having two chain ends, wherein at least one chain end comprises at least one group of formula $-C(=O)O-R_{alk}$ wherein $R_{alk}$ is a linear or branched alkyl chain comprising from 1 to 10 carbon atoms.

Preferably, step (IV) is performed by contacting the polymers obtained in step (III) with at least one compound of formula $R_{alk}-OH$, wherein $R_{alk}$ is a linear or branched alkyl chain comprising from 1 to 10 carbon atoms.

Thus, in a preferred aspect, the present invention relates to a process [process $(P_{PFPE\text{-}EST})$] comprising step (II), step (III) and step (IV) as defined above, for the synthesis of at least one polymer $(PFPE_{EST})$.

In a fifth aspect, the present invention relates to a perfluoro-polyether polymer [polymer $(PFPE_{EST})$], said polymer $(PFPE_{EST})$ comprising a perfluoropolyether backbone having two chain ends,
wherein at least one chain end comprises at least one group $-C(=O)O-R_{alk}$ wherein $R_{alk}$ is a linear or branched alkyl chain comprising from 1 to 10 carbon atoms; and wherein said backbone complies with structure ($R_{pf}$-I) as defined above for polymer (PFPE).

Preferably, the backbone of said polymer ($PFPE_{EST}$) is different from —$[(C_2F_4O)_a(C_4F_8O)_b]_y$—, wherein each of a, b and y is an integer higher than 1.

After step (IV), the following polymers are obtained:

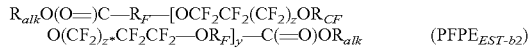

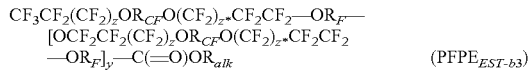

wherein $R_F$, $R_{CF}$, $R_{alk}$, z, z* and y are as defined above.

Said polymer ($PFPE_{EST}$) can be used as intermediate for the synthesis of further derivatives.

Advantageously, polymer ($PFPE_{EST}$), more preferably each of said polymer ($PFPE_{EST-b2}$) and of said polymer ($PFPE_{EST-b3}$), is contacted with at least one reducing agent to provide a perfluoropolyether polymer [polymer ($PFPE_{OH}$)] comprising a perfluoropolyether backbone as defined above for polymer (PFPE) having two chain ends, wherein at least one chain end, more preferably both chain ends, comprises at least one hydroxy group, more preferably a group of formula —$CF_2CH_2OH$.

Thus, in a further aspect, the present invention relates to a polymer [polymer ($PFPE_{OH}$)] comprising a perfluoropolyether backbone as defined above for polymer (PFPE) having two chain ends, wherein at least one chain end comprises a group of formula —$CF_2CH_2OH$, with the proviso that the backbone of said polymer ($PFPE_{OH}$) is different from —$[(C_2F_4O)_a(C_4F_8O)_b]_y$—, wherein each of a, b and y is an integer higher than 1.

More preferably, both chain ends of said polymer ($PFPE_{OH}$) comprise a group of formula —$CF_2CH_2OH$.

Also said polymer ($PFPE_{OH}$) is useful as intermediate for the synthesis of further polymers comprising a perfluoropolyether backbone as defined above for polymer (PFPE).

Among the others, the Applicant noted that said polymer ($PFPE_{OH}$) can be advantageously used for the synthesis of at least one polymer [polymer ($PFPE_{OH-X}$)] comprising a perfluoropolyether backbone as defined above for polymer (PFPE) having two chain ends, wherein at least one chain end comprises a group of formula —$CF_2CH_2O$—$R^1$, wherein $R^1$ is a linear or branched alkyl chain comprising from 1 to 16, more preferably from 3 to 6, carbon atoms and substituted with at least 2, more preferably from 2 to 8, even more preferably from 2 to 5, groups —OH.

Thus, in a sixth aspect, the present invention relates to a polymer [polymer ($PFPE_{OH-X}$)] comprising a perfluoropolyether backbone as defined above for polymer (PFPE) having two chain ends, wherein at least one chain end comprises a group of formula —$CF_2CH_2O$—$R^1$, wherein $R^1$ is a linear or branched alkyl chain comprising from 1 to 16, more preferably from 3 to 6, carbon atoms and substituted with at least 2, more preferably from 2 to 8, even more preferably from 2 to 5, groups —OH.

According to a preferred embodiment, both chain ends in said polymer ($PFPE_{OH-X}$) comprise a group of formula —$CF_2CH_2O$—$R^1$, wherein $R^1$ is as defined above.

According to a more preferred embodiment, said at least one chain end bears one group complying with the following formula, and even more preferably both chain ends comprise one group complying with the following formulae:

—$CF_2CH_2O$—$CH_2CH(OH)CH_2OH$ ($PFPE_{OH-X1}$)

—$CF_2CH_2O$—$CH_2CH(OH)CH_2O$—$CH_2CH(OH)$
    $CH_2OH$ ($PFPE_{OH-X2}$)

The Applicant also noted that at least two of polymers ($PFPE_{OH}$) and/or of polymers ($PFPE_{OH-X}$ as defined above can be reacted together, typically via a diepoxy coupling agent, to give the so called "multi dentate" PFPE polymer [polymer ($PFPE_{OH-MD}$)].

Preferably, said polymer ($PFPE_{OH-MD}$) complies with the following formula $C_e$—B-A-B-$C_e$ wherein:
each $C_e$ is a group of formula —$CF_2CH_2O$—$R^1$, wherein $R^1$ is a hydrogen atom, linear or branched alkyl chain comprising from 1 to 16 carbon atoms and substituted with at least 2, more preferably from 2 to 8, groups —OH; each B is a group complying with formula ($R_{pf}$-I) as defined above for polymer (PFPE); and
A is a divalent alkyl chain comprising from 3 to 20 carbon atoms, said alkyl chain being substituted with at least one, preferably from 1 to 10, —OH group(s) and being optionally substituted with at least one fluorine atom.

The Applicant also noted that said polymer ($PFPE_{OH}$) and said polymer ($PFPE_{OH-X}$) can be also reacted with at least one compound bearing a cyclophosphazene ring, for example following the procedure disclosed in WO 2014/195299 (SOLVAY SPECIALTY POLYMERS ITALY S.P.A.), to provide a polymer [polymer ($PFPE_{OH-PN}$)] comprising a cyclophosphazene central core bearing at least one substituent selected from said polymer ($PFPE_{OH}$) and said polymer ($PFPE_{OH-X}$).

The Applicant noted that the PFPE polymers according to the present invention comprising at least one hydroxy group in their chain end(s) can be advantageously used as lubricant for magnetic recording media (MRM).

Thus, in a further aspect, the present invention relates to the use of at least one of polymer ($PFPE_{OH}$), polymer ($PFPE_{OH-X}$), polymer ($PFPE_{OH-MD}$) and/or polymer ($PFPE_{OH-PN}$) as defined above, as lubricant for magnetic recording media (MRM).

To this aim, polymer ($PFPE_{OH}$), polymer ($PFPE_{OH-X}$), polymer ($PFPE_{OH-MD}$) and/or polymer ($PFPE_{OH-PN}$) advantageously do not comprise two or more consecutive recurring moieties comprising 1 carbon atom, i.e. recurring moieties of formula —$(CF_2O)$—. Indeed, it is known that consecutive recurring moieties of formula —$(CF_2O)$— make the polymer's backbone more prone and fragile to the attack of metal and Lewis acids than moieties comprising two or more carbon atoms. Also, this weakness is particularly increased when polymers are obtained comprising two or even more recurring moieties having one carbon atom in a row, as could happen when using traditional synthesis that provides for polymers having randomly distributed recurring units.

Even more importantly, PFPE polymers that do not comprise two or more consecutive recurring moieties comprising 1 carbon atom are able to withstand high temperatures. This property is of particular importance in the development of lubricants for use in coating magnetic recording media using the heat-assisted magnetic recording (HAMR) technology. Heat-assisted magnetic recording is a magnetic storage technology for hard drives in which a laser is used to heat the part of the disk that is being written to, such that the heat changes the magnetic properties of the disk for a short time, reducing or removing the super-paramagnetic effect while writing takes place. The effect of HAMR is to allow writing on a much smaller scale than before, greatly increasing the amount of data that can be held on a standard disk platter.

Magnetic Recording Media (MRM) typically comprise multiple layers, including a non-magnetic substrate having sequentially deposited on each side thereof an underlayer, at least one magnetic layer and a protective overcoat, preferably a carbon overcoat.

In a still further aspect, the present invention relates to a method for lubricating a magnetic recording media (MRM), said method comprising providing a magnetic recording media (MRM) comprising at least one magnetic layer, optionally covered by at least one carbon overcoat, and applying at least one of polymer (PFPE$_{OH}$), polymer (PFPE$_{OH-X}$), polymer (PFPE$_{OH-MD}$) and/or polymer (PFPE$_{OH-PN}$) as defined above, onto said magnetic layer or onto said carbon overcoat.

The step of applying a polymer according to the present invention to the MRM can be performed by any conventional method known in the art.

For example, at least one of said polymer (PFPE$_{OH}$), polymer (PFPE$_{OH-X}$), polymer (PFPE$_{OH-MD}$) and/or polymer (PFPE$_{OH-PN}$) as defined above can be directly applied on the magnetic layer, or on the protective overcoat if present, of the disk of the MRM.

Alternatively, at least one of said polymer (PFPE$_{OH}$), polymer (PFPE$_{OH-X}$), polymer (PFPE$_{OH-MD}$) and/or polymer (PFPE$_{OH-PN}$) can be first dissolved in a suitable solvent, such as hydrofluoroethers (HFEs) for example Novec™ HFEs (commercially available from 3M™), hydrofluorocarbons (HFCs) for example Vertrel® HFCs (commercially available from DuPont™), perfluorinated hydrocarbons, chlorofluorocarbons, hydrochlorofluoro-carbons and combinations thereof, thus obtaining a solution [solution (S)], then the disk is submerged in said solution (S) and slowly withdrawn therefrom.

A conventional lifter-type dipper may be used to submerge the disk of the recording medium in said solution (S). Optionally, the coated disk thus obtained is subjected to further treatments, such as for example exposure to UV radiation. The skilled person can optimize the duration of submergence and the speed of withdrawal to achieve a desired coating thickness.

Preferably, the coating comprising any one of polymer (PFPE$_{OH}$), polymer (PFPE$_{OH-X}$), polymer (PFPE$_{OH-MD}$) and/or polymer (PFPE$_{OH-PN}$) as defined above has a thickness from about 2 to about 30 angstroms (A), more preferably from 2 to 15 Å.

Should the disclosure of any patents, patent applications, and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

Experimental Section

Methods

The average number molecular weight (Mn) was determined by NMR ($^{19}$F-NMR and $^{1}$H-NMR).

EXAMPLE 1

Step (a): Synthesis of HO(CH$_2$)$_4$OCF$_2$CFHO(CF$_2$)$_4$OCFHCF$_2$O(CH$_2$)$_4$OH A three neck round bottom flask with magnetic stirring, temperature probe and reflux condenser was charged with 5.76 g of NaOH and 227.76 g of 1,4-butanediol. The mixture was heated at 70° C. under stirring till complete dissolution of sodium hydroxide. Then, the solution was cooled at 40° C. and 50 g of CF$_2$=CFO(CF$_2$)$_4$OCF=CF$_2$ was added dropwise. The resulting mixture was held at 40° C. under stirring for six hours, till complete conversion of perfluoro bis-vinylether. The crude was extracted with 80 ml of water and 80 ml of CH$_2$Cl$_2$; the aqueous phase was extracted again with 120 ml of fresh CH$_2$Cl$_2$ and the two organic phases were collected and extracted with brine (80 ml). The organic phase was separated, treated with anhydrous Na$_2$SO$_4$, filtered and solvent was evaporated under reduced pressure to obtain 57.7 g of a mixture containing:

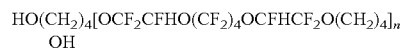

78% with n=1
15% with n=2
4% with n=3
3% with n=4

Step (b): synthesis of (EtOC(O)CF$_2$CF$_2$CF$_2$OCF$_2$CF$_2$OCF$_2$CF$_2$-)$_2$ and Higher MW Homologous 10.5 g of the mixture of alcohols prepared in step (a) were dissolved in 92.4 g of 1,2,3,4-tetrachloro hexafluorobutane and loaded in a 250 ml stainless steel mechanically stirred reactor kept at the temperature of +20° C. by an external cooling bath. 2.0 Nl/h of COF$_2$ (synthesized in a tubular reactor mixing 2.0 Nl/h of F2, 3.0 Nl/h of CO and 4.0 Nl/h of He) were fed to the reactor to convert all —OH groups to the corresponding —OC(O)F groups; the completion of the reaction is verified by IR and GC online analysis (no conversion of the COF$_2$ fed to the reactor).

Then, 2.0 Nl/h of F$_2$ diluted in 8.0 Nl/h of He were fed to the reactor to convert the hydrogen atoms present in the backbone of the formates; fluorine conversion was determined by GC online analysis: when it dropped below 60% fluorine flow was increased to 2.3 Nl/h while introducing, by a second inlet tube, 0.3 Nl/h of C3F6 (diluted in 1.5 Nl/h of He); with this fluoroolefin activation of elemental fluorine (according to U.S. Pat. No. 8,742,142 (SOLVAY SOLEXIS S.P.A.) it was possible to maintain a high fluorine conversion till complete perfluorination (pointed out by sudden fall to zero of fluorine conversion determined by GC).

The raw mixture was transferred in a PFA round bottom flask containing 20 g of anhydrous ethanol and then all volatile compounds (HF, CH$_3$CH$_2$OC(O)F, CH$_3$CH$_2$OH in excess and the solvent) were evaporated at low pressure and at a temperature not exceeding 70° C. 15.6 g of an oily transparent uncoloured liquid were obtained and analysed by IR, NMR and GPC confirming the desired structure.

Step (c): Synthesis of HOCH$_2$CF$_2$(CF$_2$)$_2$OCF$_2$CF$_2$OCF$_2$CF$_2$CF$_2$OCF$_2$CF$_2$O(CF$_2$)$_2$CF$_2$CH$_2$OH The resulting mixture of diethyl-ester polymers from step (b) was fractionated through vacuum distillation to separate the first component which was then subjected to chemical reduction with NaBH$_4$ to afford the corresponding diol as confirmed by NMR.

EXAMPLE 2

Step (a): Synthesis of HO(CH$_2$)$_3$[OCF$_2$CFHO(CF$_2$)$_3$OCFHCF$_2$O(CH$_2$)$_3$]$_n$OH A three neck round bottom flask with magnetic stirring, temperature probe and reflux condenser was charged with 6.69 g of NaOH, 82.40 g of 1,3-propanediol and 200 ml of acetonitrile. The mixture was heated at 40° C. under stirring till complete dissolution of sodium hydroxide. Then 107.40 g of CF$_2$=CFO(CF$_2$)$_3$OCF=CF$_2$ were added dropwise. The resulting mixture was held at 40° C. under stirring for six hours, till complete conversion of perfluoro-bis-vinylether. The crude was extracted with 200 ml of water and 200 ml of CH$_2$Cl$_2$; the aqueous phase was extracted again with 200 ml of fresh CH$_2$Cl$_2$ and the two organic phases were collected and extracted with brine (200 ml). The organic phase was separated, treated with anhydrous Na$_2$SO$_4$, filtered and solvent was evaporated under reduced pressure to obtain a mixture containing: 33% of HO(CH$_2$)$_3$OCF$_2$CFHO(CF$_2$)$_3$OCFHCF$_2$O(CH$_2$)$_3$OH in admixture with a cyclic ether as side product obtained from the intramolecular reaction between the hydroxy group and the vinyl group in the product of formula HO(CH$_2$)$_3$O—CF$_2$CFHO(CF$_2$)$_3$OCF=CF$_2$; 23% of HO(CH$_2$)$_3$[OCF$_2$CFHO(CF$_2$)$_3$OCFHCF$_2$O(CH$_2$)$_3$]$_n$OH with n=2, 23% of the compound with n=3 and 21% of the compound with mixture with n=4 or 5 as a admixture.

Step (b): Synthesis of (EtOC(O)CF$_2$CF$_2$OCF$_2$CF$_2$OCF$_2$)$_2$CF$_2$ and higher MW Homologous The same procedure described in step (b) of Example 1 was followed but starting from 10.7 g of the mixture of alcohols obtained in step (a) of Example 2. 15.7 g of the final diethyl-ester polymer were obtained.

Step (c): Synthesis of Polymers Having Formulae HOCH$_2$CF$_2$CF$_2$OCF$_2$CF$_2$O[(CF$_2$CF$_2$CF$_2$O)(CF$_2$CF$_2$O)]$_3$CF$_2$CF$_2$CH$_2$OH and HOCH$_2$CF$_2$CF$_2$OCF$_2$CF$_2$O[(CF$_2$CF$_2$CF$_2$O)(CF$_2$CF$_2$O)]$_5$CF$_2$CF$_2$CH$_2$OH The resulting mixture of diethyl-ester polymers from step (b) was fractionated through vacuum distillation to separate the second and the third components which were then subjected to chemical reduction with NaBH4 to afford the corresponding diols as confirmed by NMR.

Step (d): Synthesis of Polymers Having Formulae HOCH$_2$CH(OH)CH$_2$OCH$_2$CF$_2$CF$_2$OCF$_2$CF$_2$O[(CF$_2$CF$_2$CF$_2$O)(CF$_2$CF$_2$O)]$_3$CF$_2$CF$_2$CH$_2$OCH$_2$CH(OH)CH$_2$OH The diol HOCH$_2$CF$_2$CF$_2$OCF$_2$CF$_2$O[(CF$_2$CF$_2$CF$_2$O)—(CF$_2$CF$_2$O)]$_3$C—F$_2$CF$_2$— —CH$_2$OH prepared in step (c) was reacted with the mesyl derivative of Solketal following the procedure described in U.S. Pat. No. 8,513,471 (SOLVAY SOLEXIS S.P.A.) to provide the corresponding tetraol as confirmed by NMR analysis.

EXAMPLE 3

Step (a): Synthesis of [HO(CH$_2$)$_4$OCF$_2$CFHOCF$_2$OCF$_2$CF$_2$]$_2$O

A three neck round bottom flask with magnetic stirring, temperature probe and reflux condenser was charged with 3.95 g of NaOH, 178 g of 1,4-butanediol and 80 ml of HCF$_2$CF$_2$OCH$_2$CH$_2$OCF$_2$CF$_2$H. The mixture was heated at 70° C. under stirring till complete dissolution of sodium hydroxide, then 54 g of [CF$_2$=CFOCF$_2$OCF$_2$CF$_2$]$_2$O were added dropwise. The resulting mixture was held at 70° C. under stirring for three hours, till complete conversion of perfluoro-bis-vinylether. The crude was extracted with 150 ml of water; the organic layer was separated and solvent was evaporated at 100° C. under reduced pressure. The residual viscous oil was filtered to obtain 33 g of a mixture containing: HO(CH$_2$)$_4$[OCF$_2$CFHOCF$_2$O(CF$_2$)$_2$O(CF$_2$)$_2$OCF$_2$OCFHCF$_2$O(CH$_2$)$_4$]$_n$OH with n from 1 to 4.

Step (b): Synthesis of (EtOC(O)CF$_2$CF$_2$CF$_2$OCF$_2$CF$_2$OCF$_2$OCF$_2$CF$_2$—)$_2$O and Higher MW Homologous The same procedure described in step (b) of Example 1 was followed but starting from 10.2 g of the mixture of alcohols obtained in step (a) of Example 3.

15.0 g of the final diethyl-ester polymers were obtained.

EXAMPLE 4

Step (a): Synthesis of HO(CH$_2$)$_4$[OCF$_2$CFHO(CF$_2$)$_3$OCFHCF$_2$O(CH$_2$)$_4$]$_n$OH A three neck round bottom flask with magnetic stirring, temperature probe and reflux condenser was charged with 8.7 g of NaOH, 78.12 g of 1,4-butanediol and 300 ml of acetonitrile. The mixture was heated at 40° C. under stirring for three hours and, then, 147.91 g of CF$_2$=CFO(CF$_2$)$_3$OCF=CF$_2$ were added drop wise. The resulting mixture was held at 40° C. under stirring for two hours, till complete conversion of perfluoro bis-vinylether. Acetonitrile was then evaporated at 60° C. under reduced pressure and the crude was extracted with 300 ml of water and 300 ml of CH$_2$Cl$_2$. The aqueous phase was extracted again with 300 ml of fresh CH$_2$Cl$_2$ and the two organic phases were collected and extracted with brine (200 ml). The organic phase was separated, treated with anhydrous Na$_2$SO$_4$, filtered and solvent was evaporated under reduced pressure to obtain 167.07 g of a mixture containing: HO(CH$_2$)$_4$OCF$_2$CFHO(CF$_2$)$_3$OCFHCF$_2$O(CH$_2$)$_4$OH in admixture with a cyclic ether as side product obtained from the intramolecular reaction between the hydroxy group and the vinyl group in the product of formula

HO(CH$_2$)$_4$O—CF$_2$CFHO(CF$_2$)$_3$OCF=CF$_2$;

HO(CH$_2$)$_4$[OCF$_2$CFHO(CF$_2$)$_3$OCFHCF$_2$O(CH$_2$)$_4$]$_n$OH with n=2, 3 and a mixture with n=4 or 5.

Step (b): Synthesis of (EtOC(O)CF$_2$CF$_2$CF$_2$OCF$_2$CF$_2$OCF$_2$)$_2$CF$_2$ and Higher MW Homologous The same procedure described in step (b) of Example 1 was followed but starting from 10.9 g of the mixture of alcohols obtained in step (a) of Example 4.

16.0 g of the final diethyl-ester polymers were obtained.

The invention claimed is:

1. A process (P$_{FH}$) for the synthesis of at least one polymer (FH), said polymer (FH) comprising a partially fluorinated polyether backbone having two chain ends, wherein said chain ends comprise at least one group selected from hydroxy group, allyl group and vinyl group, said process (P$_{FH}$) comprising:
   (I) contacting at least one compound (F), wherein compound (F) is a perfluoro compound comprising at least two unsaturated groups selected from vinyl groups and allyl groups, with at least one compound (H), wherein compound (H) is a fully or partially hydrogenated compound comprising at least two hydroxy groups,
   to provide a polymer (FH),
   said polymer (FH) being characterized in that its backbone comprises recurring unit(s) derived from said at least one compound (F) alternately arranged with recurring unit(s) derived from said at least one compound (H).

2. The process according to claim 1, wherein said compound (F) complies with the following formula:

CF$_2$=CF(CF$_2$)$_z$OR$_{CF}$O(CF$_2$)$_{z*}$CF=CF$_2$ wherein
each of z and z* is independently 0 or 1; and
R$_{CF}$ is a perfluoro alkylene chain comprising from 1 to 20 carbon atoms and
optionally interrupted by one or more oxygen atoms; and/or
said compound (H) complies with the following formula:

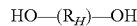
HO—(R$_H$)—OH wherein
$R_H$ is a linear or branched alkylene chain comprising from 2 to 12 carbon atoms,
said alkyl chain optionally comprising one or more fluorine atoms(s) and optionally being interrupted by one or more oxygen atoms.

3. The process according to claim 1, wherein step (I) comprises adding, to said compound (F) and to said compound (H), one or more compound (F-mono), wherein compound (F-mono) is a compound comprising one unsaturated group selected from vinyl group and allyl group, and/or one compound (H-mono), wherein compound (H-mono) is a compound comprising one hydroxy group.

4. A polymer (FH*) comprising a partially fluorinated polyether backbone having two chain ends, wherein
each of said chain ends comprises a group selected from hydroxy group, allyl group or vinyl group; and
said backbone complies with structure ($R_{FH}$-I):

—[CF$_2$CFH(CF$_2$)$_z$OR$_{CF}$O(CF$_2$)$_{z*}$CFHCF$_2$—OR$_H$O]$_y$— ($R_{FH}$-I)

wherein
each of z and z* is independently 0 or 1;
$R_{CF}$ is a perfluoro alkylene chain comprising from 1 to 20 carbon atoms and optionally interrupted by one or more oxygen atoms;
$R_H$ is a linear or branched alkylene chain comprising from 2 to 12 carbon atoms, said alkyl chain optionally comprising one or more fluorine atoms and optionally being interrupted by one or more oxygen atoms; and
y is an integer, such that the average number molecular weight of the backbone of said polymer (FH) as determined by NMR analysis is from 306 to 50000.

5. The polymer (FH*) according to claim 4, wherein said polymer (FH*) is selected from polymers of formulae (FH$_{b1}$) to (FH$_{b3}$):

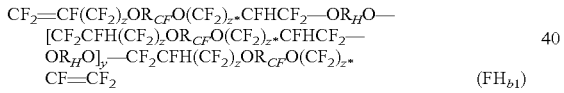
CF$_2$=CF(CF$_2$)$_z$OR$_{CF}$O(CF$_2$)$_{z*}$CFHCF$_2$—OR$_H$O—[CF$_2$CFH(CF$_2$)$_z$OR$_{CF}$O(CF$_2$)$_{z*}$CFHCF$_2$—OR$_H$O]$_y$—CF$_2$CFH(CF$_2$)$_z$OR$_{CF}$O(CF$_2$)$_{z*}$CF=CF$_2$ (FH$_{b1}$)

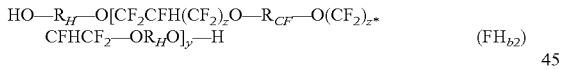
HO—R$_H$—O[CF$_2$CFH(CF$_2$)$_z$O—R$_{CF}$—O(CF$_2$)$_{z*}$CFHCF$_2$—OR$_H$O]$_y$—H (FH$_{b2}$)

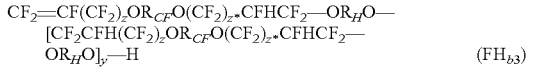
CF$_2$=CF(CF$_2$)$_z$OR$_{CF}$O(CF$_2$)$_{z*}$CFHCF$_2$—OR$_H$O—[CF$_2$CFH(CF$_2$)$_z$OR$_{CF}$O(CF$_2$)$_{z*}$CFHCF$_2$—OR$_H$O]$_y$—H (FH$_{b3}$)

wherein
each of z and z* is independently 0 or 1;
$R_{CF}$ is a perfluoro alkylene chain comprising from 1 to 20 carbon atoms and optionally interrupted by one or more oxygen atoms;
$R_H$ is a linear or branched alkylene chain comprising from 2 to 12 carbon atoms, said alkyl chain optionally comprising one or more fluorine atoms and optionally being interrupted by one or more oxygen atoms; and
y is an integer, such that the average number molecular weight of the backbone of said polymer (FH) as determined by NMR analysis is from 306 to 50000.

6. A process ($P_{PFPE}$) for the synthesis of a polymer (PFPE), said polymer (PFPE) comprising a perfluorinated polyether backbone having two chain ends, wherein each chain end comprises at least one group selected from
—OC(=O)F and perfluorinated alkyl chain comprising from 2 to 3 carbon atoms, said process ($P_{PFPE}$) comprising:

(III) contacting at least one polymer (FH) or polymer (FH*) with a source of fluorine, to provide polymer (PFPE), wherein:
polymer (FH) is a polymer comprising a partially fluorinated polyether backbone having two chain ends, wherein
each of said chain ends comprise at least one group selected from hydroxy group, allyl group and vinyl group; and
said backbone comprises recurring unit(s) derived from at least one compound (F), wherein compound (F) is a perfluoro compound comprising at least two unsaturated groups selected from vinyl groups and allyl groups, alternately arranged with recurring unit(s) derived from at least one compound (H), wherein compound (H) is a fully or partially hydrogenated compound comprising at least two hydroxy groups; and
polymer (FH*) is a polymer comprising a partially fluorinated polyether backbone having two chain ends, wherein
each of said chain ends comprises a group selected from hydroxy group, allyl group or vinyl group; and
said backbone complies with structure ($R_{FH}$-I):

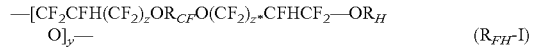
—[CF$_2$CFH(CF$_2$)$_z$OR$_{CF}$O(CF$_2$)$_{z*}$CFHCF$_2$—OR$_H$O]$_y$— ($R_{FH}$-I)

wherein
each of z and z* is independently 0 or 1;
$R_{CF}$ is a perfluoro alkylene chain comprising from 1 to 20 carbon atoms and optionally interrupted by one or more oxygen atoms;
$R_H$ is a linear or branched alkylene chain comprising from 2 to 12 carbon atoms, said alkyl chain optionally comprising one or more fluorine atoms and optionally being interrupted by one or more oxygen atoms; and
y is an integer, such that the average number molecular weight of the backbone of said polymer (FH) as determined by NMR analysis is from 306 to 50000.

7. The process according to claim 6, wherein said polymer (FH*) complies with formula (FH$_{b1}$):

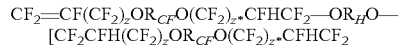
CF$_2$=CF(CF$_2$)$_z$OR$_{CF}$O(CF$_2$)$_{z*}$CFHCF$_2$—OR$_H$O—[CF$_2$CFH(CF$_2$)$_z$OR$_{CF}$O(CF$_2$)$_{z*}$CFHCF$_2$

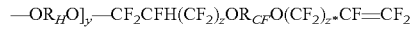
—OR$_H$O]$_y$—CF$_2$CFH(CF$_2$)$_z$OR$_{CF}$O(CF$_2$)$_{z*}$CF=CF$_2$ wherein
each of z and z* is independently 0 or 1;
$R_{CF}$ is a perfluoro alkylene chain comprising from 1 to 20 carbon atoms and optionally interrupted by one or more oxygen atoms;
$R_H$ is a linear or branched alkylene chain comprising from 2 to 12 carbon atoms, said alkyl chain optionally comprising one or more fluorine atoms and optionally being interrupted by one or more oxygen atoms; and
y is an integer, such that the average number molecular weight of the backbone of said polymer (FH) as determined by NMR analysis is from 306 to 50000.

8. A perfluoropolyether polymer (PFPE), said polymer (PFPE) comprising a perfluoropolyether backbone having two chain ends,
wherein:
each chain end comprises at least one group selected from
—OC(=O)F and perfluorinated alkyl chain comprising from 2 to 3 carbon atoms and said backbone complies with structure ($R_{pf}$-I):

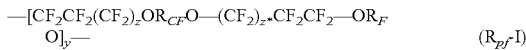

$$—[CF_2CF_2(CF_2)_zOR_{CF}O—(CF_2)_{z*}CF_2CF_2—OR_F O]_y—\quad (R_{pf}\text{-I})$$

wherein
 $R_{CF}$ is a perfluoro alkyl chain comprising from 1 to 20 optionally interrupted by one or more oxygen atoms;
 $R_F$ is a perfluoro alkyl chain comprising from 2 to 12 carbon atoms, optionally interrupted by one or more oxygen atoms;
 each of z and z* is independently 0 or 1; and
 y is an integer, such that the average number molecular weight of the backbone of said polymer (PFPE) as determined by NMR analysis is from 414 to 70 000;
 with the proviso that:
  when both z and z* are 0, at least one of said moiety $R_{CF}$ and said moiety $R_F$ is different from —$CF_2CF_2$— and —$CF_2CF_2CF_2$—; and
  when both z and z* are 1, at least one of moiety $R_{CF}$ and moiety $R_F$ is different from —$CF_2CF_2CF_2$—.

9. A process ($P_{PFPE-EST}$) for the synthesis of a polymer ($PFPE_{EST}$), said polymer ($PFPE_{EST}$) comprising a perfluorinated polyether backbone complying with formula ($R_{pf}$-I):

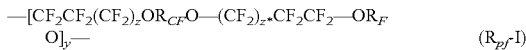

$$—[CF_2CF_2(CF_2)_zOR_{CF}O—(CF_2)_{z*}CF_2CF_2—OR_F O]_y—\quad (R_{pf}\text{-I})$$

wherein
 $R_{CF}$ is a perfluoro alkyl chain comprising from 1 to 20 optionally interrupted by one or more oxygen atoms;
 $R_F$ is a perfluoro alkyl chain comprising from 2 to 12 carbon atoms, optionally interrupted by one or more oxygen atoms;
 each of z and z* is independently 0 or 1; and
 y is an integer, such that the average number molecular weight of the backbone of said polymer (PFPE) as determined by NMR analysis is from 414 to 70 000,
and having two chain ends, wherein at least one chain end comprises at least one group of formula —C(=O)O—$R_{alk}$, wherein $R_{alk}$ is a linear or branched alkyl chain comprising from 1 to 10 carbon atoms, said process ($P_{PFPE-EST}$) comprising:
(II) contacting said at least one polymer (FH) or polymer (FH*), with at least one compound selected from $F_2C(=O)$, ClFC(=O), or BrFC(=O);
(III) contacting the at least one polymer obtained after step (II) with a source of fluorine, to provide polymer (PFPE); and
(IV) contacting the at least one polymer obtained in step (III) with at least one compound of formula $R_{alk}$—OH, wherein $R_{alk}$ is a linear or branched alkyl chain comprising from 1 to 10 carbon atoms, to provide polymer ($PFPE_{EST}$), wherein:
 polymer (FH) is a polymer comprising a partially fluorinated polyether backbone having two chain ends, wherein
  each of said chain ends comprise at least one group selected from hydroxy group, allyl group and vinyl group; and
  said backbone comprises recurring unit(s) derived from at least one compound (F), wherein compound (F) is a perfluoro compound comprising at least two unsaturated groups selected from vinyl groups and allyl groups, alternately arranged with recurring unit(s) derived from at least one compound (H), wherein compound (H) is a fully or partially hydrogenated compound comprising at least two hydroxy groups; and polymer (FH*) is a polymer comprising a partially fluorinated polyether backbone having two chain ends, wherein
  each of said chain ends comprises a group selected from hydroxy group, allyl group or vinyl group; and
  said backbone complies with structure ($R_{FH}$-I):

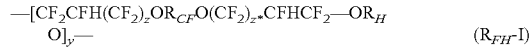

$$—[CF_2CFH(CF_2)_zOR_{CF}O(CF_2)_{z*}CFHCF_2—OR_H O]_y—\quad (R_{FH}\text{-I})$$

wherein
 each of z and z* is independently 0 or 1;
 $R_{CF}$ is a perfluoro alkylene chain comprising from 1 to 20 carbon atoms and optionally interrupted by one or more oxygen atoms;
 $R_H$ is a linear or branched alkylene chain comprising from 2 to 12 carbon atoms, said alkyl chain optionally comprising one or more fluorine atoms and optionally being interrupted by one or more oxygen atoms; and
 y is an integer, such that the average number molecular weight of the backbone of said polymer (FH) as determined by NMR analysis is from 306 to 50000.

10. The process according to claim 9, wherein said polymer (FH*) is selected from polymers of the following formulae:

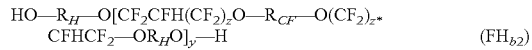

$$HO—R_H—O[CF_2CFH(CF_2)_zO—R_{CF}—O(CF_2)_{z*}CFHCF_2—OR_HO]_y—H \quad (FH_{b2})$$

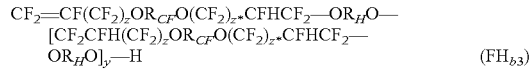

$$CF_2=CF(CF_2)_zOR_{CF}O(CF_2)_{z*}CFHCF_2—OR_HO—[CF_2CFH(CF_2)_zOR_{CF}O(CF_2)_{z*}CFHCF_2—OR_HO]_y—H \quad (FH_{b3})$$

wherein
each of z and z* is independently 0 or 1;
$R_{CF}$ is a perfluoro alkylene chain comprising from 1 to 20 carbon atoms and optionally interrupted by one or more oxygen atoms;
$R_H$ is a linear or branched alkylene chain comprising from 2 to 12 carbon atoms, said alkyl chain optionally comprising one or more fluorine atoms and optionally being interrupted by one or more oxygen atoms; and
y is an integer, such that the average number molecular weight of the backbone of said polymer (FH) as determined by NMR analysis is from 306 to 50000.

11. A polymer ($PFPE_{EST}$) comprising a perfluoropolyether backbone complying with formula ($R_{pf}$-I):

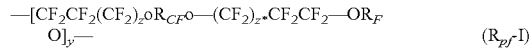

$$—[CF_2CF_2(CF_2)_zR_{CF}O—(CF_2)_{z*}CF_2CF_2—OR_F O]_y—\quad (R_{pf}\text{-I})$$

wherein
 $R_{CF}$ is a perfluoro alkyl chain comprising from 1 to 20 optionally interrupted by one or more oxygen atoms;
 $R_F$ is a perfluoro alkyl chain comprising from 2 to 12 carbon atoms, optionally interrupted by one or more oxygen atoms;
 each of z and z* is independently 0 or 1; and
 y is an integer, such that the average number molecular weight of the backbone of
 said polymer (PFPE) as determined by NMR analysis is from 414 to 70 000,
and having two chain ends, wherein at least one chain end, and preferably both said chain comprises at least one group —C(=O)O—$R_{alk}$, wherein $R_{alk}$ is a linear or branched alkyl chain comprising from 1 to 10 carbon atoms.

12. The polymer ($PFPE_{EST}$) according to claim 11, wherein said polymer ($PFPE_{EST}$) is selected from polymers of formulae:

$R_{alk}O(O=)C-R_F-[OCF_2CF_2(CF_2)_zOR_{CF}O(CF_2)_{z*}$
$CF_2CF_2-OR_F]_y-C(=O)OR_{alk}$ (PFPE$_{EST-b2}$)

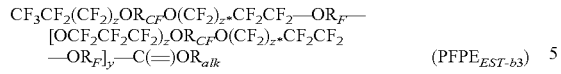

$CF_3CF_2(CF_2)_zOR_{CF}O(CF_2)_{z*}CF_2CF_2-OR_F-$
$[OCF_2CF_2CF_2)_zOR_{CF}O(CF_2)_{z*}CF_2CF_2$
$-OR_F]_y-C(=O)OR_{alk}$ (PFPE$_{EST-b3}$)

wherein
$R_{CF}$ is a perfluoro alkyl chain comprising from 1 to 20 optionally interrupted by one or more oxygen atoms;
$R_F$ is a perfluoro alkyl chain comprising from 2 to 12 carbon atoms, optionally interrupted by one or more oxygen atoms;
each of z and z* is independently 0 or 1;
y is an integer, such that the average number molecular weight of the backbone of said polymer (PFPE) as determined by NMR analysis is from 414 to 70 000; and
$R_{alk}$ is a linear or branched alkyl chain comprising from 1 to 10 carbon atoms.

13. A polymer (PFPE$_{OH}$) comprising a perfluoropolyether backbone complying with formula ($R_{pf}$-I):

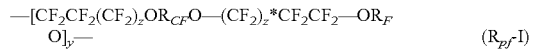

$-[CF_2CF_2(CF_2)_zOR_{CF}O-(CF_2)_{z*}CF_2CF_2-OR_F$
$O]_y-$ ($R_{pf}$-I)

wherein
$R_{CF}$ is a perfluoro alkyl chain comprising from 1 to 20 optionally interrupted by one or more oxygen atoms;
$R_F$ is a perfluoro alkyl chain comprising from 2 to 12 carbon atoms, optionally interrupted by one or more oxygen atoms;
each of z and z* is independently 0 or 1; and
y is an integer, such that the average number molecular weight of the backbone of
said polymer (PFPE) as determined by NMR analysis is from 414 to 70 000,
and having two chain ends, wherein at least one chain end comprises a group of formula —CF$_2$CH$_2$OH,
with the proviso that the backbone of said polymer (PFPE$_{OH}$) is different from —[(C$_2$F$_4$O)$_a$(C$_4$F$_8$O)$_b$]$_y$— wherein each of a, b and y is an integer higher than 1.

14. A polymer (PFPE$_{OH-X}$) comprising a perfluoropolyether backbone complying with formula ($R_{pf}$-I):

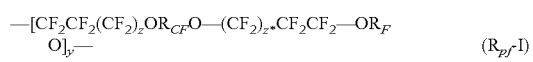

$-[CF_2CF_2(CF_2)_zOR_{CF}O-(CF_2)_{z*}CF_2CF_2-OR_F$
$O]_y-$ ($R_{pf}$-I)

wherein
$R_{CF}$ is a perfluoro alkyl chain comprising from 1 to 20 optionally interrupted by one or more oxygen atoms;
$R_F$ is a perfluoro alkyl chain comprising from 2 to 12 carbon atoms, optionally interrupted by one or more oxygen atoms;
each of z and z* is independently 0 or 1; and
y is an integer, such that the average number molecular weight of the backbone of
said polymer (PFPE) as determined by NMR analysis is from 414 to 70 000,
and having two chain ends, wherein at least one chain end comprises a group of formula —CF$_2$CH$_2$O—R$^1$, wherein R$^1$ is a linear or branched alkyl chain comprising from 1 to 16 carbon atoms and substituted with at least 2 groups —OH.

15. The polymer (PFPE$_{OH-X}$) according to 14, wherein both said chain ends comprise a group complying with one of the following formulae:

$-CF_2CH_2O-CH_2CH(OH)CH_2OH$ (PFPE$_{OH-X1}$)

$-CF_2CH_2O-CH_2CH(OH)CH_2OCH_2CH(OH)$
$CH_2OH$ (PFPE$_{OH-X2}$).

16. A polymer (PFPE$_{OH-MD}$) complying with the following formula $C_e$-B-A-B-$C_e$ wherein:
each $C_e$ is a group of formula —CF$_2$CH$_2$O—R$^1$, wherein R$^1$ is a hydrogen atom, linear or branched alkyl chain comprising from 1 to 16 carbon atoms and substituted with at least 2 groups —OH;
each B is a group complying with formula ($R_{pf}$-I):

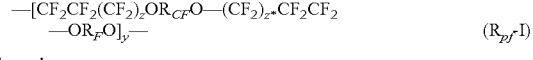

$-[CF_2CF_2(CF_2)_zOR_{CF}O-(CF_2)_{z*}CF_2CF_2$
$-OR_FO]_y-$ ($R_{pf}$-I)

wherein
$R_{CF}$ is a perfluoro alkyl chain comprising from 1 to 20 optionally interrupted by one or more oxygen atoms;
$R_F$ is a perfluoro alkyl chain comprising from 2 to 12 carbon atoms, optionally interrupted by one or more oxygen atoms;
each of z and z* is independently 0 or 1; and
y is an integer, such that the average number molecular weight of the backbone of said polymer (PFPE) as determined by NMR analysis is from 414 to 70 000; and
A is a divalent alkyl chain comprising from 3 to 20 carbon atoms, said alkyl chain being substituted with at least one —OH group(s) and being optionally substituted with at least one fluorine atom.

17. A method for lubricating a magnetic recording media (MRM), said method comprising providing a magnetic recording media (MRM) comprising at least one magnetic layer, optionally covered by at least one carbon overcoat, and applying at least one of polymer (PFPE$_{OH}$), polymer (PFPE$_{OH-X}$) and/or polymer (PFPE$_{OH-MD}$) onto said magnetic layer or onto said carbon overcoat, wherein:
polymer (PFPE$_{OH}$) is a polymer comprising a perfluoropolyether backbone complying with formula ($R_{pf}$-I) and having two chain ends, wherein at least one chain end comprises a group of formula —CF$_2$CH$_2$OH, with the proviso that the backbone of said polymer (PFPE$_{OH}$) is different from —[(C$_2$F$_4$O)$_a$(C$_4$F$_8$O)$_b$]$_x$— wherein each of a, b and y is an integer higher than 1;
polymer (PFPE$_{OH-X}$) is a polymer comprising a perfluoropolyether backbone complying with formula ($R_d$-I) and having two chain ends, wherein at least one chain end comprises a group of formula —CF$_2$CH$_2$O—R$^1$, wherein R$^1$ is a linear or branched alkyl chain comprising from 1 to 16 carbon atoms and substituted with at least 2 groups —OH; and
polymer (PFPE$_{OH-MD}$) is a polymer complying with the following formula $C_e$-B-A-B-$C_e$ wherein:
each $C_e$ is a group of formula —CF$_2$CH$_2$O—R$^1$, wherein R$^1$ is a hydrogen atom, linear or branched alkyl chain comprising from 1 to 16 carbon atoms and substituted with at least 2 groups —OH;
each B is a group complying with formula ($R_{pf}$-I); and
A is a divalent alkyl chain comprising from 3 to 20 carbon atoms, said alkyl chain being substituted with at least one —OH group(s) and being optionally substituted with at least one fluorine atom,
and wherein formula ($R_{pf}$-I) is:

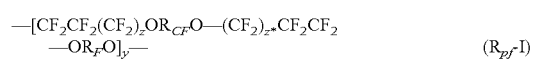

$-[CF_2CF_2(CF_2)_zOR_{CF}O-(CF_2)_{z*}CF_2CF_2$
$-OR_FO]_y-$ ($R_{pf}$-I)

wherein
$R_{CF}$ is a perfluoro alkyl chain comprising from 1 to 20 optionally interrupted by one or more oxygen atoms;
$R_F$ is a perfluoro alkyl chain comprising from 2 to 12 carbon atoms, optionally interrupted by one or more oxygen atoms;
each of z and z* is independently 0 or 1; and
y is an integer, such that the average number molecular weight of the backbone of said polymer (PFPE) as determined by NMR analysis is from 414 to 70 000.

* * * * *